(12) United States Patent
Kandru et al.

(10) Patent No.: US 10,795,805 B2
(45) Date of Patent: *Oct. 6, 2020

(54) PERFORMANCE ENGINEERING PLATFORM AND METRIC MANAGEMENT

(71) Applicant: Capital One Services, LLC, McLean, VA (US)

(72) Inventors: Sashi Kandru, Ashburn, VA (US); Navin Yadav, Aurora, OH (US); Joshua McNeil, Richmond, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/429,392

(22) Filed: Jun. 3, 2019

(65) Prior Publication Data
US 2020/0233780 A1 Jul. 23, 2020

Related U.S. Application Data

(63) Continuation of application No. 16/254,454, filed on Jan. 22, 2019, now Pat. No. 10,353,804.

(51) Int. Cl.
*G06F 9/44* (2018.01)
*G06F 11/36* (2006.01)
*G06F 9/451* (2018.01)

(52) U.S. Cl.
CPC .......... *G06F 11/3664* (2013.01); *G06F 9/451* (2018.02); *G06F 11/3616* (2013.01); *G06F 11/3688* (2013.01)

(58) Field of Classification Search
CPC .. G06F 11/3664; G06F 11/3616; G06F 9/451; G06F 11/3688
See application file for complete search history.

(56) References Cited

U.S. PATENT DOCUMENTS

| | | | |
|---|---|---|---|
| 5,394,540 A * | 2/1995 | Barrington | H04L 43/50 703/21 |
| 6,243,832 B1 * | 6/2001 | Eckes | G06F 11/3414 714/33 |
| 6,249,886 B1 * | 6/2001 | Kalkunte | G06F 11/3414 714/39 |
| 6,601,020 B1 * | 7/2003 | Myers | G06F 11/3414 455/67.14 |

(Continued)

*Primary Examiner* — Adam Lee

(57) ABSTRACT

A flexible, adaptive performance test platform allows a test developer to customize performance tests to more realistically determine the impact of network behavior on a system under test. The test platform may be accessed through the use of a Graphic User Interface (GUI) by all developers within an enterprise to generate and execute performance tests prior to release of new systems by the enterprise. In one aspect, the test platform enables developers to share performance tests, thereby leveraging existing work product to reduce the overall system development time. In another aspect, the test platform enables developers to customize performance tests, providing the flexibility to easily specify a duration, scale, geography and/or resource for the test. In another aspect, the test platform enables developers to customize and monitor one or more metrics in accordance with the particular performance goals of the SUT, to enable a developer to more easily identify system issues.

16 Claims, 9 Drawing Sheets

(56) References Cited

U.S. PATENT DOCUMENTS

| | | | |
|---|---|---|---|
| 6,775,824 B1* | 8/2004 | Osborne, II | G06F 11/3664 714/46 |
| 6,981,180 B1 | 12/2005 | Bailey et al. | |
| 7,099,789 B1* | 8/2006 | Wu | G01R 31/2894 324/522 |
| 7,100,091 B2* | 8/2006 | Nakamoto | H04L 43/50 714/43 |
| 7,359,820 B1 | 4/2008 | Browne et al. | |
| 7,376,550 B1* | 5/2008 | Bokaemper | G06F 11/3414 703/21 |
| 7,539,489 B1 | 5/2009 | Alexander | |
| 7,559,001 B2 | 7/2009 | Betawar et al. | |
| 7,620,989 B1* | 11/2009 | Couturier | H04L 63/1433 726/22 |
| 8,005,638 B1* | 8/2011 | Mehta | G01R 31/2868 702/116 |
| 8,612,530 B1* | 12/2013 | Sapovalovs | H04L 43/50 707/602 |
| 8,743,735 B1 | 6/2014 | Bershteyn et al. | |
| 8,826,084 B1 | 9/2014 | Gauf et al. | |
| 9,116,873 B2 | 8/2015 | Majumdar et al. | |
| 9,529,963 B1* | 12/2016 | Wilson | G01R 31/31835 |
| 9,558,465 B1* | 1/2017 | Arguelles | G06F 11/263 |
| 9,800,480 B1* | 10/2017 | Eichler | H04L 43/50 |
| 9,824,001 B2 | 11/2017 | Bhattacharya | |
| 10,210,074 B1* | 2/2019 | Szerenyi | G06F 11/3672 |
| 10,425,320 B2* | 9/2019 | Nistor | H04L 67/02 |
| 2003/0074606 A1* | 4/2003 | Boker | G06F 11/3414 714/42 |
| 2003/0156549 A1* | 8/2003 | Binder | H04L 43/50 370/252 |
| 2003/0233173 A1* | 12/2003 | Stewart | G05D 23/1931 700/299 |
| 2006/0045019 A1* | 3/2006 | Patzschke | H04L 43/50 370/241 |
| 2006/0271322 A1 | 11/2006 | Haggerty | |
| 2007/0112549 A1* | 5/2007 | Lau | G06F 11/3414 703/13 |
| 2007/0162894 A1 | 7/2007 | Noller et al. | |
| 2008/0010523 A1* | 1/2008 | Mukherjee | H04L 43/50 714/25 |
| 2008/0151752 A1* | 6/2008 | Evans | H04L 65/80 370/235 |
| 2008/0198742 A1* | 8/2008 | Kaempfer | H04L 43/50 370/230 |
| 2009/0089619 A1* | 4/2009 | Huang | H04L 12/66 714/37 |
| 2009/0192761 A1* | 7/2009 | Pearl | G06F 11/3495 702/182 |
| 2009/0271662 A1 | 10/2009 | Tarta | |
| 2010/0095167 A1* | 4/2010 | Kotrla | H04L 43/0847 714/705 |
| 2010/0268459 A1* | 10/2010 | O'Shea | G01C 25/00 701/532 |
| 2011/0069621 A1* | 3/2011 | Gintis | H04L 43/50 370/250 |
| 2011/0069626 A1* | 3/2011 | Sun | H04L 41/5038 370/252 |
| 2012/0197582 A1* | 8/2012 | Richardson | G06F 11/2294 702/122 |
| 2012/0207030 A1* | 8/2012 | Luong | H04W 24/06 370/245 |
| 2012/0221277 A1* | 8/2012 | Gregg | H04B 17/11 702/106 |
| 2013/0054792 A1* | 2/2013 | Sharaf | G06F 11/3688 709/224 |
| 2013/0311977 A1 | 11/2013 | Nieminen et al. | |
| 2013/0318291 A1 | 11/2013 | Pepper et al. | |
| 2014/0032637 A1* | 1/2014 | Weir | G06F 11/273 709/203 |
| 2014/0088950 A1* | 3/2014 | Majumdar | G06F 9/455 703/27 |
| 2014/0129878 A1 | 5/2014 | Saltzman et al. | |
| 2014/0160927 A1* | 6/2014 | Majumdar | H04L 47/10 370/235 |
| 2014/0160961 A1* | 6/2014 | Dragulescu | H04L 43/0894 370/252 |
| 2014/0250328 A1 | 9/2014 | Schnizler et al. | |
| 2014/0254647 A1 | 9/2014 | Stott et al. | |
| 2014/0258781 A1 | 9/2014 | Cook | |
| 2014/0321285 A1* | 10/2014 | Chew | H04L 43/12 370/236 |
| 2015/0051872 A1* | 2/2015 | Arora | G06F 11/3428 702/186 |
| 2015/0067333 A1* | 3/2015 | Cipu | H04L 43/10 713/171 |
| 2015/0074770 A1* | 3/2015 | McBeath | H04L 43/50 726/4 |
| 2015/0106670 A1* | 4/2015 | Gintis | G01R 31/3272 714/712 |
| 2015/0140956 A1* | 5/2015 | Prewitt, II | H04M 3/362 455/405 |
| 2015/0163124 A1* | 6/2015 | Girmonsky | H04L 41/142 709/224 |
| 2015/0180743 A1* | 6/2015 | Jana | G06F 3/04842 715/736 |
| 2015/0286552 A1 | 10/2015 | Michelsen | |
| 2016/0169962 A1* | 6/2016 | Horst | G01R 31/318307 324/750.02 |
| 2016/0182310 A1* | 6/2016 | Gintis | H04L 43/0811 370/248 |
| 2016/0188445 A1* | 6/2016 | Hermeto | G06F 11/3692 714/38.1 |
| 2017/0010947 A1* | 1/2017 | Lu | G06F 11/3006 |
| 2017/0046254 A1* | 2/2017 | Buege | G06F 11/3457 |
| 2017/0060720 A1 | 3/2017 | Ramanath | |
| 2017/0068608 A1* | 3/2017 | Covell | G06F 11/3466 |
| 2017/0180233 A1* | 6/2017 | Nistor | H04L 41/12 |
| 2017/0264524 A1* | 9/2017 | Lakkavalli | H04W 24/08 |
| 2017/0272352 A1 | 9/2017 | Badea et al. | |
| 2017/0295084 A1* | 10/2017 | Ramanath | H04L 43/0876 |
| 2017/0331707 A1* | 11/2017 | Grinkemeyer | H04H 20/12 |
| 2017/0344467 A1* | 11/2017 | Yadav | G06F 11/3664 |
| 2018/0011955 A1* | 1/2018 | Gintis | H04L 41/00 |
| 2018/0019967 A1* | 1/2018 | Ameling | H04L 12/66 |
| 2018/0024916 A1* | 1/2018 | Shazly | G06F 11/3688 717/124 |
| 2018/0049052 A1 | 2/2018 | Doshi et al. | |
| 2018/0101631 A1* | 4/2018 | Havard | G06F 11/3062 |
| 2018/0150371 A1 | 5/2018 | Gintis | |
| 2018/0217923 A1 | 8/2018 | Rossler | |
| 2018/0287906 A1 | 10/2018 | Clements | |
| 2018/0293157 A1 | 10/2018 | Dougherty et al. | |
| 2018/0349254 A1* | 12/2018 | Hui | G06F 11/3692 |
| 2018/0373885 A1* | 12/2018 | Arad | G06F 21/629 |
| 2018/0375751 A1* | 12/2018 | Lee | H04L 43/50 |
| 2019/0109777 A1* | 4/2019 | Mircescu | H04L 67/104 |
| 2019/0166008 A1* | 5/2019 | Gintis | H04L 41/142 |
| 2019/0260663 A1* | 8/2019 | Pueblas | H04L 63/1408 |

* cited by examiner

FIG. 5

RUNNING A TEST

TO RUN A TEST, SIMPLY CLICK ON THE GREEN PLAY BUTTON FOR THE SPECIFIED TEST

YOUR TESTS

[ADD TEST]

[SEARCH TESTS]

| TEST NAME | BAP | GIT REPO | FILE NAME | NO. OF AGENTS | Rs. TIME(msec) TARGET | TPS TARGET | ERROR % THRESHOLD | DATE CREATED | ACTION |
|---|---|---|---|---|---|---|---|---|---|
| FOURTHTESTBYMICHELLE | C1387639 | dummyRepoForTest | test1.jmx | 1 | 1 | 1 | 1 | 04/04/2018 @ 1:28PM | △ |
| TEST3MICHELLE | C1387639 | dummyRepoForTest | test2.jmx | 1 | 1 | 1 | 1 | 03/27/2018 @ 4:18PM | △ |
| SECONDTESTFORMICHELLE | C1387639 | dummyRepoForTest | | 1 | 1 | 1 | 1 | 03/16/2018 @ 11:59AM | △ |
| MICHELLE-TEST | C1387639 | dummyRepoForTest | | 1 | 1 | 1 | 1 | 03/15/2018 @ 3:31PM | △ |

PERFORMANCE ENGINEERING PLATFORM AND METRIC MANAGEMENT

CROSS-REFERENCE TO RELATED APPLICATION

This application is a continuation of U.S. patent application Ser. No. 16/254,454, filed on Jan. 22, 2019, the disclosure of which is incorporated herein by reference in its entirety.

BACKGROUND

Almost all modern service providers use the internet to provide service offerings to potential consumers. The service offerings are generally provided in the form of software applications which operate using dedicated resources of the service provider. Together, the applications and the resources dedicated to the applications form a system within the service provider infrastructure that supports the service offering.

To maintain goodwill, it is desirable that any system that is released by a service provider be free from defects which may create delays, corrupt customer data or otherwise adversely affect system performance. System problems, such as those caused by poor application performance or resource deficiencies may reduce customer confidence, degrade service provider goodwill and potentially result in loss of sales. Accordingly, before any system is released, it is important to test the operation of the system in the environment in which it ultimately will be utilized.

Performance test tools are commercially available that can be used to identify issues with software and hardware prior to the general release. Performance test tools simulate real-time workloads to "exercise" the system under test under virtual real-world conditions. Performance test tools can include software running on the system under test, software running on a remote computer that manages computer tests to interact with the system under test, or both. Performance test may be used to determine how the system under test will perform under a particular collection of workloads. Workload simulation forms an integral part of performance test. In workload simulation, different workloads are generated and subjected upon a system under test, in order to simulate the conditions under which the computing system will operate.

One challenge that is faced by performance tests is the increasing diversity and complexity of the network environment used by consumers. Systems must be able to interact both with consumers and with systems hosted by other service providers, over a variety of geographically diverse networks, using computers operating under a variety of different operating systems. It is difficult for existing performance test tools to keep pace with the dynamic network environment in which a system may be deployed.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. According to one aspect, a system includes a processor and a non-volatile memory storing test platform program code. The test platform program code operable, when executed upon by the processor, may be operable to control a user interface of a workstation that is configured to receive input related to a test, the input including at least one test attribute and a selected performance metric. The program code may be operable to generate the test for the SUT in response to the at least one test attribute. The program code may be operable to deploy an agent to execute the test on a server, the server selected from a pool of servers in response to the at least one test attribute, the agent for generating first network traffic in accordance with the at least one test attribute to test the SUT. The program code may be operable to store second network traffic, the second network traffic including test results received from applying the first network traffic to the SUT. The program code may be operable to determine a resulting performance metric for the SUT. The program code may be operable to display the resulting performance metric on the user interface. Other embodiments of this aspect include corresponding computer systems, apparatus, and computer programs recorded on one or more computer storage devices, each configured to perform the actions of the methods.

According to another aspect, a method for testing a SUT (system under test) includes the steps of receiving at least one test attribute and a selected performance metric at a user interface of a workstation; generating a test for the SUT in response to the at least one test attribute; deploying an agent to execute the test on a server, the server selected from a pool of servers in response to the at least one test attribute, the agent for generating first network traffic to test the SUT by executing the test of the at least one test attribute; storing, in a non-volatile storage device, second network traffic including test results received from applying the first network traffic to the SUT; processing the test results to determine a resulting performance metric for the SUT; and displaying the resulting performance metric on the user interface. Other embodiments of this aspect include corresponding computer systems, apparatus, and computer programs recorded on one or more computer storage devices, each configured to perform the actions of the methods.

According to another aspect a test platform for managing a system under test (SUT) includes a processor; a non-volatile memory having program code stored thereon, the program code operable when executed upon by the processor to manage a graphical user interface (GUI) to configure, launch and analyze a test of the SUT, the GUI including: a test creation window configured to accept a plurality of test attributes and a performance metric from a user, the test attributes including a virtual user field identifying a number of simulated users for the test, a geographic location of the test, a test duration field, a test ramp up field and a test ramp down field; a test launch window, configured to accept one or more performance metrics for the test, the one or more performance metrics selected from a group including an error rate, a response time or a transaction rate, the test launch window including program code configured to deploy an agent to execute the test on a server, the server selected from a pool of servers in response to the test attributes, the agent for generating first network traffic to test the SUT; and a test result window, including program code for processing second network traffic received from the SUT in response to the first network traffic as a test result to determine and display the one or more performance metrics for the SUT. Other embodiments of this aspect include corresponding computer systems, apparatus, and computer programs recorded on one or more computer storage devices, each configured to perform the actions of the methods.

BRIEF DESCRIPTION OF THE DRAWINGS

FIG. 5 illustrates a window that may be displayed by a GUI of FIG. 1 when generating tests by test platform of FIG. 1;

FIG. 7 illustrates a window that may be displayed by GUI of FIG. 1 for test launch.

DEFINITIONS

Figure 1:
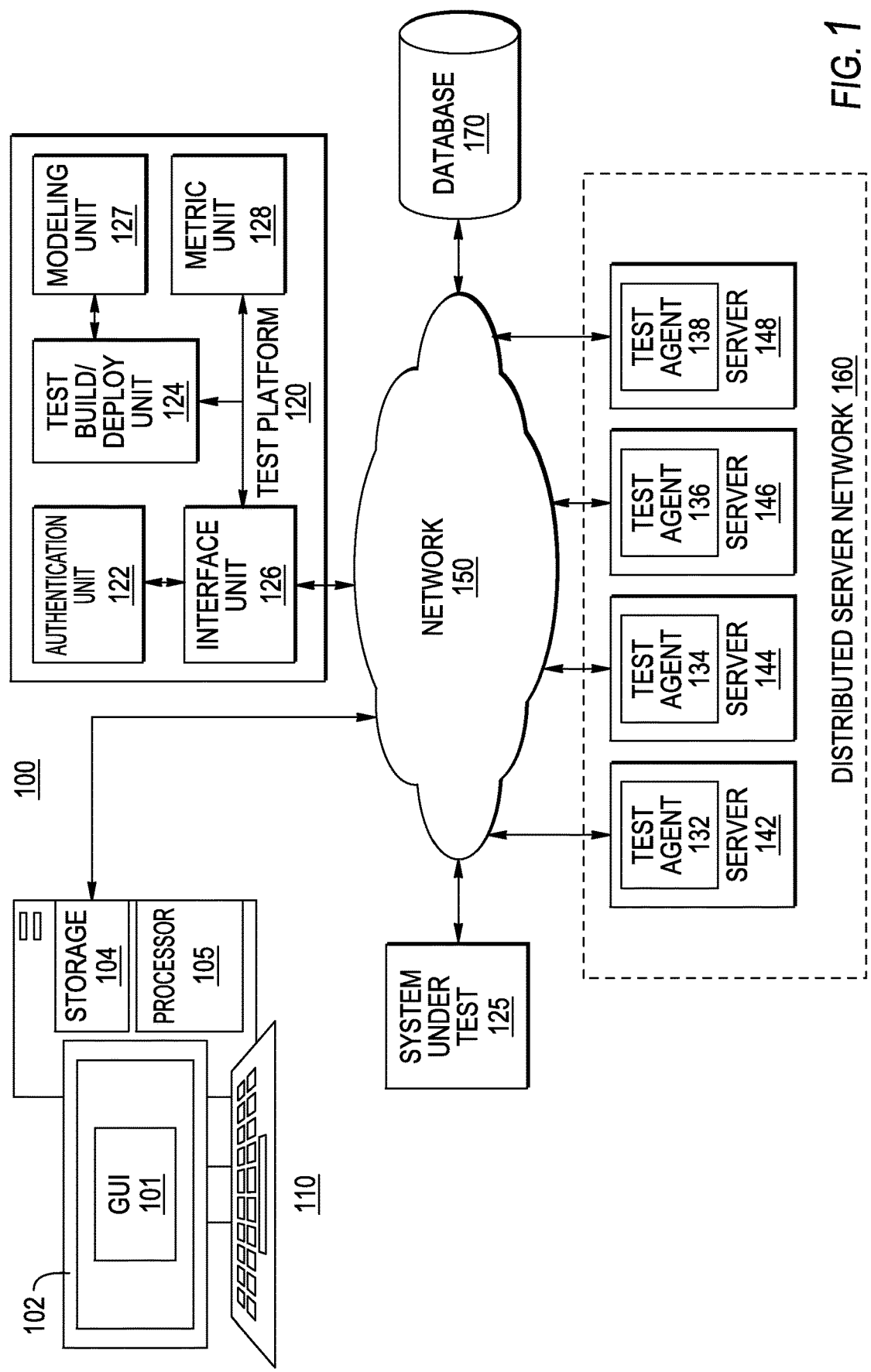
FIG. 1 is a block diagram of one embodiment of a network including a test platform of the invention.

As used herein, unless specifically indicated otherwise, the word "or" is used in the inclusive sense of "and/or" and not the exclusive sense of "either/or."

In order for the present invention to be more readily understood, certain terms are first defined below. Additional definitions for the following terms and other terms are set forth throughout the specification.

Agent means software code that is generated by the Test Platform, programmed to perform a specific task and deployed to operate on a resource of a test network.

Component/System/Unit: As used in this application, the terms "component" or "unit" are intended to refer to a computer-related entity, either hardware, a combination of hardware and software, software, or software in execution, examples of which are described herein. For example, a component can be, but is not limited to being, a process running on a processor, a processor, a hard disk drive, multiple storage drives (of optical and/or magnetic storage medium), an object, an executable, a thread of execution, a program, and/or a computer. A system or a unit may be comprised of a plurality of coupled components. By way of illustration, both an application running on a server and the server can be a component. The application and the resources used to support the application may be referred to as a system.

Enterprise Network means an enterprise's communications backbone that helps connect computers and related devices across departments and workgroup networks, facilitating insight and data accessibility. An enterprise network reduces communication protocols, facilitating system and device interoperability, as well as improved internal and external enterprise data management.

Improve, increase or reduce or grammatical equivalents, indicates values that are relative to a baseline measurement, such as measurements related to machine throughput, performance or efficiency.

Metric means a performance measurement.

System Under Test (SUT) means a system whose operation and performance is evaluated by one or more performance tests.

Test means a collection of instructions that result in the performance of a particular task.

Test Network means any directly or indirectly interconnected set of resources (applications, services, data, computing systems, storage devices) which are available to the test platform for testing the SUT. The resources may comprise any mix of local or geographically distributed resources or cloud-based resources, and the network may include any combination of Local Area Network (LAN), Metropolitan Area Network (MAN) or Wide Area Network (WAN) communication protocols.

Test Platform means a system of the present invention which may be controlled by a Graphic User Interface (GUI) to generate and execute performance tests for a SUT, and to collect information, analyze metrics and display results of the performance tests.

Test Run means a group of tests that may have interdependencies and that are launched together from the test platform.

DETAILED DESCRIPTION

A flexible, adaptive performance test platform allows a test developer to customize performance tests to more realistically determine the impact of network behavior on a system under test. The test platform may be accessed through the use of a Graphic User Interface (GUI) by all developers within an enterprise network to generate and execute performance tests prior to release of new systems by the enterprise. In one aspect, the test platform enables developers to share performance tests, thereby leveraging existing work product to reduce the overall system development time. In another aspect, the test platform enables developers to customize performance tests, providing the flexibility to easily specify a duration, scale, geography and/or resource for the test. In another aspect, the test platform enables developers to customize and monitor one or more metrics in accordance with the particular performance goals of the SUT to enable a developer to more easily identify system issues.

These and other features of the invention will now be described with reference to the attached figures, where like numbers refer to like elements throughout. In one embodiment, a test platform 120, SUT 125, workstation 110, a database 170 and a distributed server network 160 are shown coupled via network 150.

The network 150 may be any one of or the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks. Each of the components shown in FIG. 1 may be coupled together using different resources of network 150. For example, test platform 120 may operate at or within an enterprise network, and be used to test the SUT 125 prior to its formal release. The test platform 120 may be controlled by a coupled developer operating workstation 110. Accordingly, the SUT 125, workstation 110 and test platform may communicate using LAN networks and protocols. The distributed server network 160 includes a plurality of application servers 142, 144, 146 and 148, each of which may be used to generate network traffic to test the SUT 125. Accordingly, each server 142, 144, 146 and 148 may communicate with the SUT 125 and test platform 120 using WAN networks and protocols. As will be described in more detail below, each of the servers may host a test agent (such as test agents 132, 134, 136 and 138), each of which generates network traffic in accordance with an associated test in order to test SUT 125.

The workstation 110 is a computing device comprising a display 102, and a processor 105 (e.g., a central processing unit (CPU), a graphics processing unit (GPU), or both) communicatively coupled to a machine-readable storage device 104 (e.g., read-only memory (ROM), flash memory, dynamic random-access memory (DRAM) such as synchronous DRAM (SDRAM) or Rambus DRAM (RDRAM), etc.). In one aspect, the storage device 104 includes instructions stored thereon which are operable when executed upon by the processor 105 to display a graphic user interface (GUI) 101 to a performance test developer ("developer"). In one aspect, the GUI 101 includes input mechanisms that enable the developer to generate, execute, track and analyze performance tests for a System Under Test (SUT) 125.

It should be noted that although the GUI 101 is described as a display of a workstation, the present invention is not limited to the use of any physical medium providing a display and/or control input. In alternate embodiments, the workstation 110 may be a personal computer (PC), a tablet PC, a Personal Digital Assistant (PDA), a cellular telephone, or any machine capable of displaying controls to a laboratory technician and receiving control from the technician to responsively execute a set of instructions (sequential or otherwise) that specify actions to be taken by the system 100. Further, while only a single workstation 101 is illustrated, the term "workstation" shall also be taken to include any collection of devices that individually or jointly execute a set (or multiple sets) of instructions to perform any one or more of the methodologies discussed herein.

Database 170 comprises data storage resources that may be used, for example, to collect any combination of tests, test result data, test metrics and the like. The database 170 may be comprised of coupled data resources comprising any combination of local storage, distributed data center storage or cloud-based storage.

In one aspect, the test platform 120 comprises a plurality of components that may be used to generate a tests, including an interface unit 126 for communicating with network 150, authentication unit 122 for authorizing users of the test platform 120, a modeling unit 127 for modeling a test environment for deployment of the test, a test build/deploy unit 124 for generating and executing tests, and a metric unit 128 for monitoring execution of the test including collecting running metrics for the test, analyzing test results and metrics and displaying test results.

Each component (122-128) of the test platform performs various tasks in the preparation, execution and analysis of system tests. In one embodiment, the test platform 120 advantageously uses a secure cloud services platform, such as Amazon Web Services (AWS) for compute power, database storage, content delivery and other functionality to assist with performance testing. AWS provides a mix of infrastructure as a service (IaaS), platform as a service (PaaS) and packaged software as a service (SaaS) offerings. AWS provides services from dozens of data centers spread across regions throughout the world. According to one aspect, it is realized that AWS, or similar cloud services platforms can be advantageously leveraged to spin up virtual machines (VMs) and replicate data in different data centers to achieve a robust and scalable testing environment.

Figure 2:
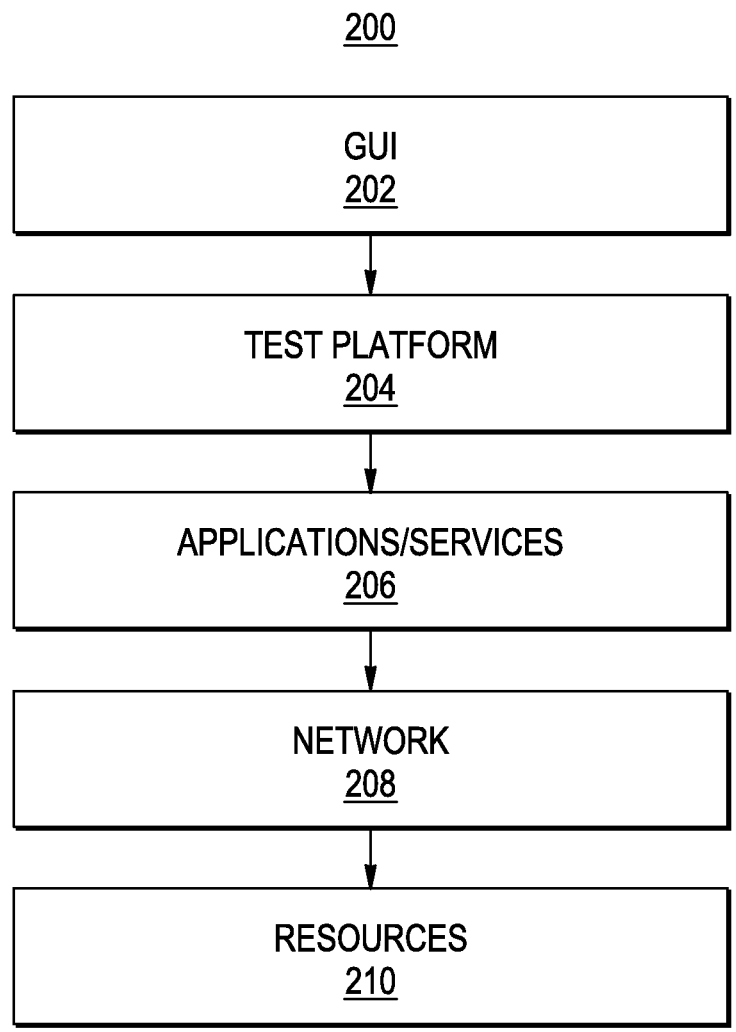
FIG. 2 is a diagram illustrating various layers of an architecture of a test network including the test platform of FIG. 1.

FIG. 2 shows a diagram illustrating the various software layers of a performance test architecture 200 of the present invention. A GUI 202 comprises a thin client that is executed on a developer workstation to provide control mechanisms allowing the developer to control the operation of components of the test platform 204. The test platform 204, during operation and in response to the control input, invokes one or more applications/services 206, which may include one or both of shared, distributed services or dedicated, custom services optimized for and hosted by the test platform. The applications/services in turn access different resources 210 via network 208 during execution of their tasks, where resources include processors, servers, storage devices and network bandwidth.

Figure 3:
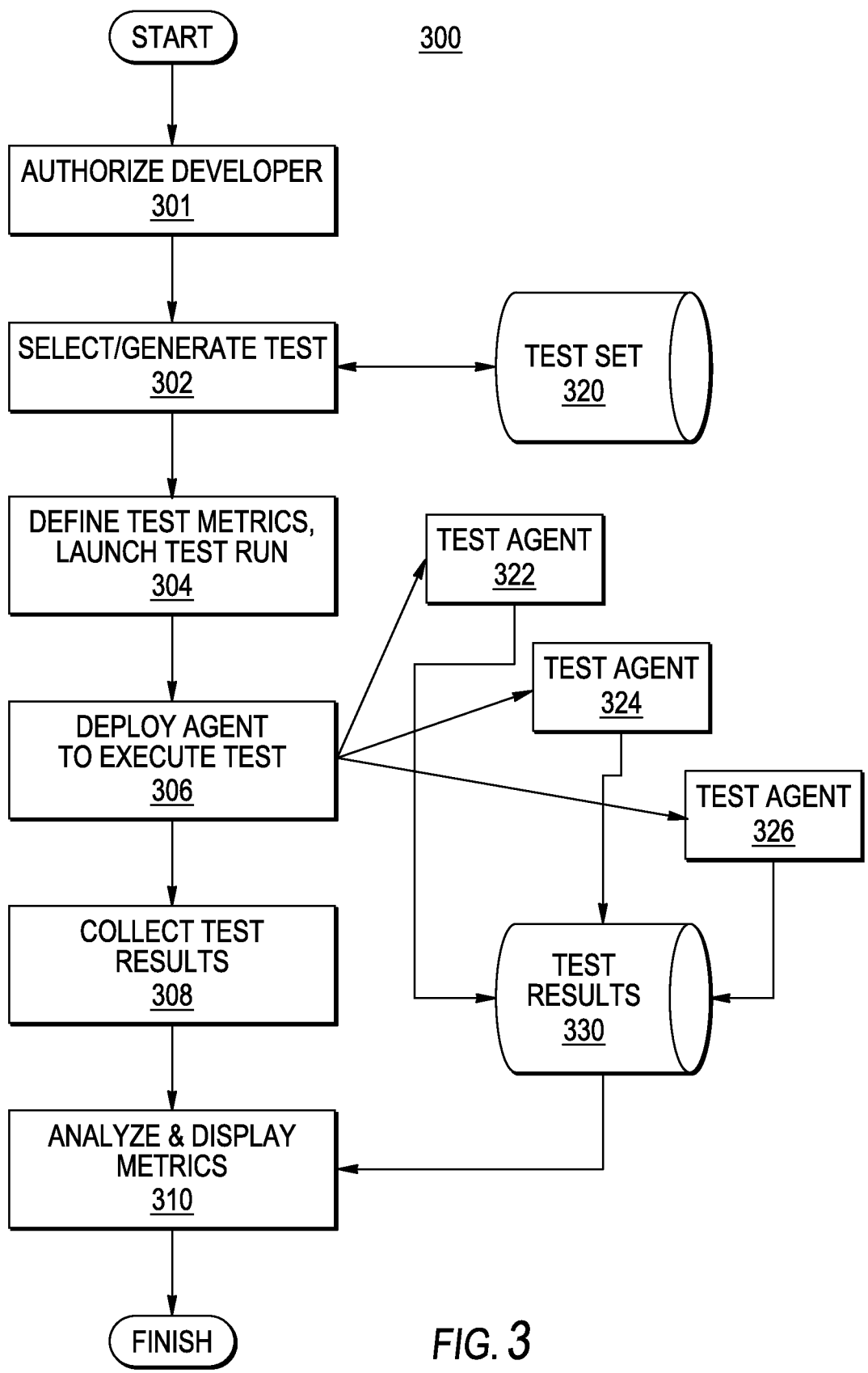
FIG. 3 is a flow diagram illustrating exemplary steps that may be performed to build and deploy performance tests using the test platform of FIG. 1.

FIG. 3 is a flow diagram illustrating exemplary steps that may be performed during a process 300 of test generation, execution, monitoring and analysis by the test platform 204. At step 301, the developer logs into the test platform using an authentication service. The authentication service may include a user/password or key exchange, be a single factor or multi-factor, etc.

At step 302 the developer begins the process of building a test run by creating or selecting one or more tests to be applied to a SUT. For example, the developer may select a test from a set of pre-existing tests ("Test Set 320") for use in a test run. Alternatively, the developer may create a new test, customized for the particular SUT. According to one aspect, each test includes a scaling factor that indicates the number of times that the particular test is replicated (i.e., the number of agents that are deployed for a particular test) throughout the test network for the test run. For example, to test a particular geographical region, a pool of agents may be deployed to resources associated with that region. Each test is configured to generate network traffic for the purposes of exercising functionality of the application and also an application's management and responsiveness to different network traffic patterns and loads.

Once the test run has been populated with tests, at step 304 the desired metrics are determined, where the metrics may include key performance indicators (KPI) such as latency, transactions per second, and acceptable error rate. The developer then launches the test run.

In one embodiment, when the test run is launched, each test is used to populate an application image, which is launched as an agent to run on one or more destination server devices. Each agent executes at the respective server device to provide network traffic to the SUT to test the application. In one embodiment, agents may be geographically deployed; i.e., agents may be deployed to a pool servers in different geographical regions to determine the adequacy of underlying system resources supporting the application within those regions. The collection of agents for each test and/or each test run may be referred to as a cluster of agents. For illustration purposes, it is shown that test agent 322, test agent 324 and test agent 326 are deployed in response to test launch at step 306.

During execution of a test run, at step 308 the test results 330 are collected. In one aspect, during testing the results are analyzed at step 310, and metrics are dynamically calculated during the run. In one embodiment, tests may be terminated in response to a threshold being satisfied, where the threshold may be a key performance indicator threshold, for example, an error rate threshold or delay time exceeded. During and following test, the data is analyzed, and metrics are dynamically updated at the GUI to enable a developer to control the continuation of testing in response to ongoing observation of response behavior of the SUT.

Figure 4A:
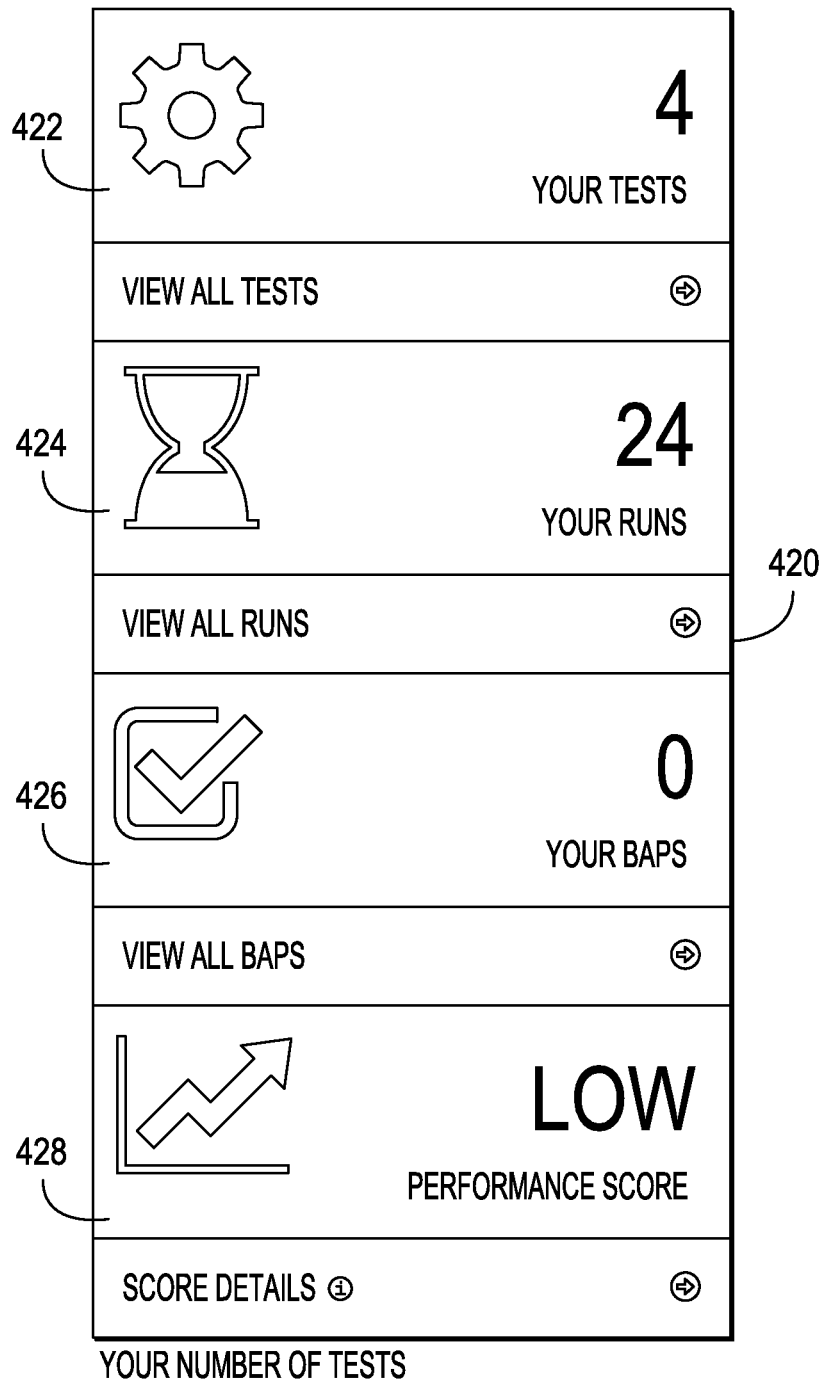
FIG. 4A and FIG. 4B illustrate windows that may be provided on a graphic user interface (GUI) for use by a developer to control the test platform of FIG. 1.

FIG. 4A illustrates a status window 420 associated with the test platform. The status window 420 is personal to a developer and provides an indication to the developer as to the status of current test runs. In FIG. 4A, test run count 422 indicates that the developer has four (4) currently executing or recently completed test runs. Icon 424 indicates the number of test executions managed by the current user and Icon 426 indicates the number of BAPs (categorization for business applications) the current user is responsible for. BAPs, in one embodiment, are an internal designation for tracking components of a software application. They usually represent an individual service or code artifact. Icon 428 provides a visual representation of the performance of the SUT at the then current point in the testing process.

Figure 4B:
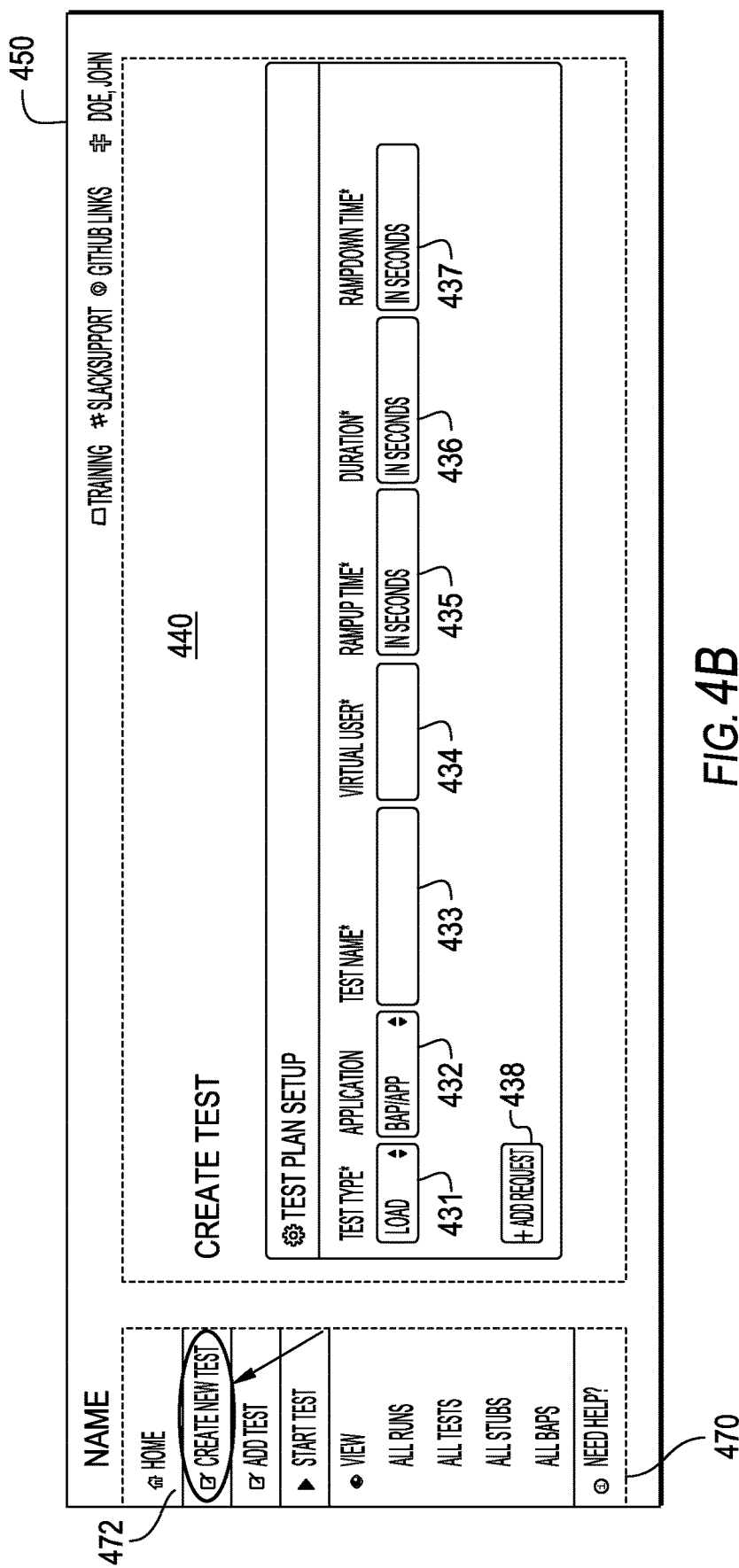

FIG. 4B illustrates an exemplary landing window 450 of a test platform GUI, including a window menu 470. Each item of the window menu 470 is associated with different aspects of the test platform, and includes a menu with selections such as 472 to allow a user to navigate between different aspects of the test platform. The illustrated menu items include a home window, a create new test window, an add test window (for adding pre-existing tests, for example as developed by other developers for other SUTs), a start test window and a plurality of view windows, which vary based on the amount, extent and type of result information that is to be displayed. Although certain types of windows are shown available in the menu 470, it is understood that information may be combined in a variety of ways, and the present invention is not limited to any particular arrangement of information in the test platform GUI windows.

Selection of a window populates portion 440 of the test platform display 450. In the example of FIG. 4B, a window 440 is populated with input fields for defining a new test to be created by the developer upon selection of 'create new test' input 472. The fields include a test type field 431 (load, stress or other), an application field 432 indicating the BAP/application that is the System Under Test for this new test, a test name 433, a virtual user field 434 identifying a number of simulated users of the test, and test timing fields, including a ramp up time field 435, a duration field 436 and a ramp-down time field 437.

Once parameters of the test have been identified and the fields 431-437 populated, the developer selects button 438 to add the test to the test run.

Figure 5:
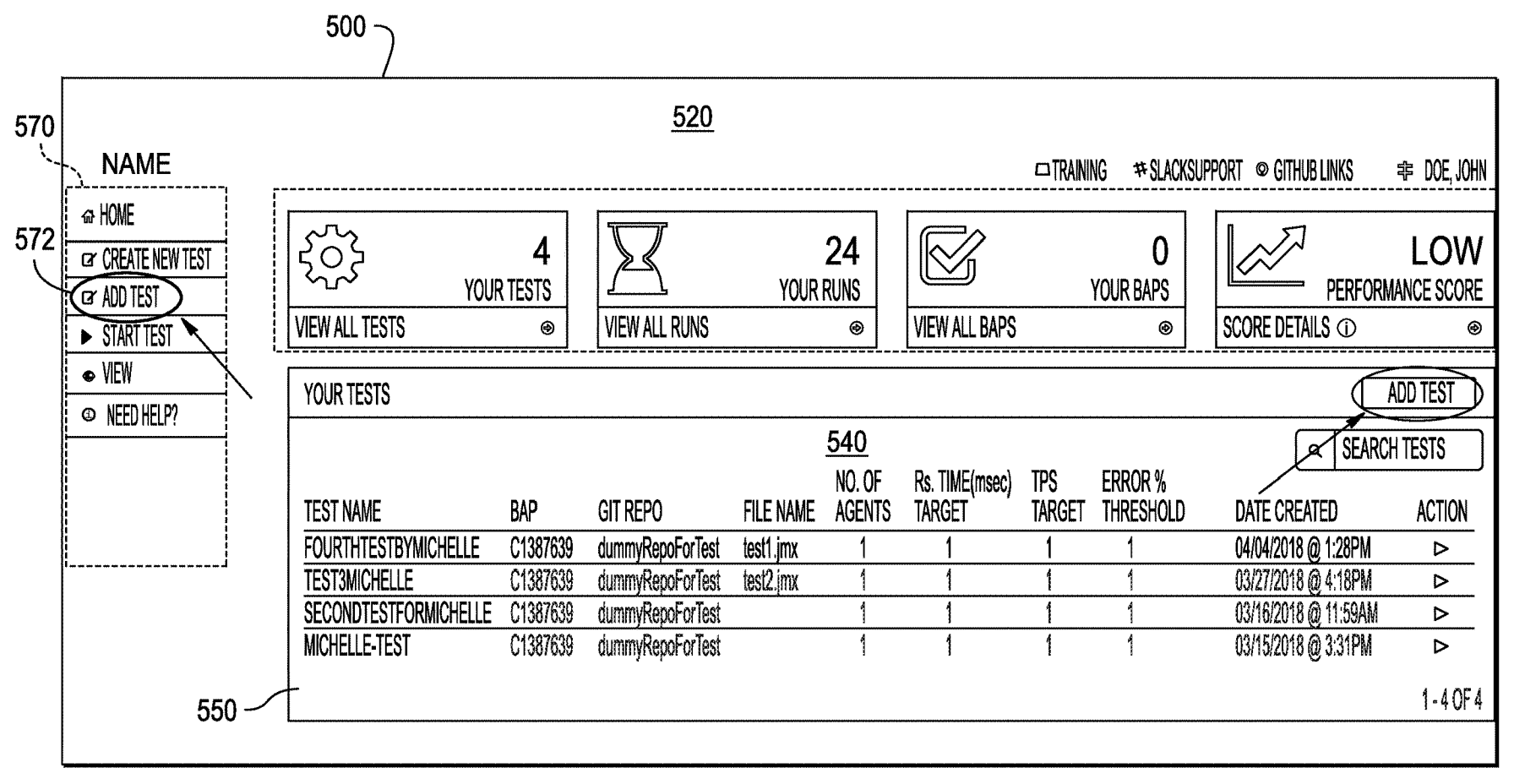

FIG. 5 illustrates a window 500 that may be displayed by GUI 101 in response to selection of the add test option 572 of window menu 570. Selection of option 572 results in the population of window portion 540 with a table 550 of pre-existing tests. The pre-existing tests may have been previously developed by the developer, or by other authorized developers in the enterprise, allowing previous work to be leveraged to improve the performance of the test system. Status window 520 is shown displayed as a banner within window 500.

Once the test run is populated either using custom tests as shown in FIG. 4B or pre-existing tests as shown in FIG. 5, the test run is ready for launch and window 600 is displayed to the developer. Window 600 includes a variety of input fields enabling the developer to define attributes of the tests including both test attribute fields and test failure criterion. These fields include ASP 601, BAP 602, a test name 603, a line of business (LOB) 604 associated with the test, the geographic location of the test 605, the branch name (or division within the enterprise), associated with the test 606, a subfolder path 607 specifying desired location of the test results, the name of agents 608 within the agent cluster of the test run, the scheduled duration 609, the web address of a custom dashboard 610 for viewing test status and results, the hostname of the SUT 611, and one or more performance metrics, such as average response time 612, average transaction rate per second 613 and desired error rate 614. The ability to customize metrics for each test run provides a significant advantage to developers with knowledge of the potential shortcomings and challenges that will be faced by a SUT in operation as it allows them to more quickly pinpoint performance issues, reducing overall performance test duration and increasing its efficacy.

Figure 6:
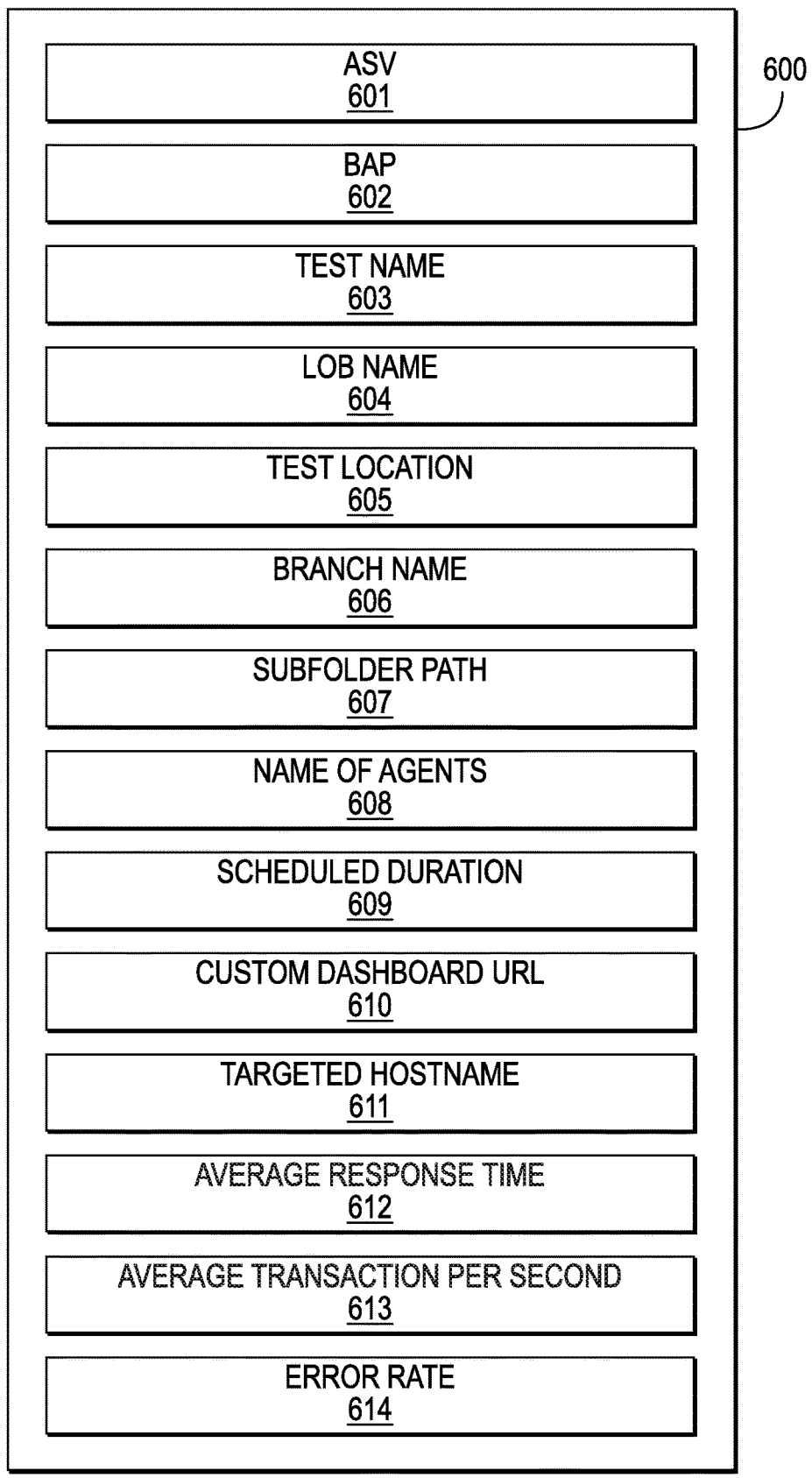
FIG. 6 illustrates an input mechanism that may be displayed by GUI of FIG. 1 to customize test runs and define performance metrics according to the invention.

Once all of the test run attributes have been populated as shown in FIG. 6, the test run is ready for launch. FIG. 7 illustrates a window 700 that may be displayed to a developer. Window 700 illustrates all unlaunched test runs associated with the developer. To launch a test run, the developer selects any one of the buttons indicated within circle 702.

Figure 8:
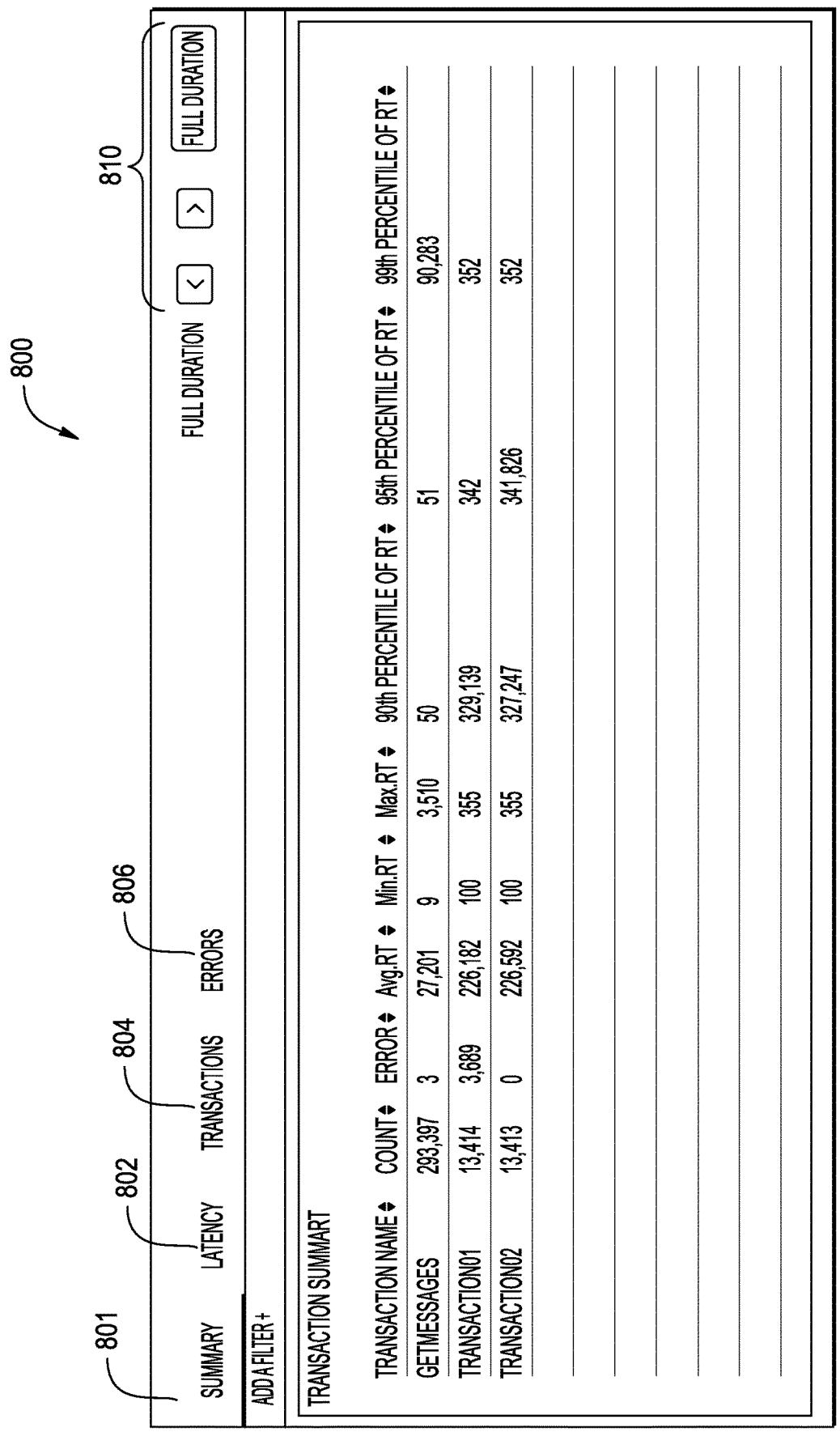
FIG. 8 illustrates an exemplary test result window that may be displayed following the execution of a test by the test platform FIG. 1.

FIG. 8 illustrates an exemplary test result window 800 that may be displayed by GUI of FIG. 1 following the execution of a test by the test platform 120. The window is shown to include a plurality of tabs including a summary tab 801 and a plurality of key performance indicator tables such as latency tab 802, transaction tab 804 and errors tab 806. As shown in window 800, the summary tab combines all of the key performance indicators into one result. Window 800 illustrates the KPI indicators for each test within the test run, giving the developer greater insight into the impact of individual tests of the test run. Buttons 810 can be used to navigate in time through the test run, displaying the key performance indicators at that point in time, to further provide the developer the opportunity to understand the impact of loads and intervening tasks upon the test run.

A test platform has been shown and described that takes advantage of a layered software architecture to provide flexible and scalable test environments which more accurately reflect the real-time network behavior for a SUT. In one aspect, a GUI enables developers to share performance tests, thereby leveraging existing work product to reduce the overall system development time. In another aspect, the test platform enables developers to customize performance goals particular to a SUT, to enable a developer to more easily identify system issues.

Some embodiments may have been described herein using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Moreover, unless otherwise noted the features described above are recognized to be usable together in any combination. Thus, any features discussed separately may be employed in combination with each other unless it is noted that the features are incompatible with each other.

With general reference to notations and nomenclature used herein, the detailed descriptions herein may be presented in terms of functional blocks or units that might be implemented as program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein, which form part of one or more embodiments. Rather, the operations are machine operations. Useful machines for performing operations of various embodiments include general purpose digital computers or similar devices.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but still co-operate or interact with each other.

Various embodiments also relate to apparatus or systems for performing these operations. This apparatus may be specially constructed for the required purpose or it may comprise a general-purpose computer as selectively activated or reconfigured by a computer program stored in the computer. The procedures presented herein are not inherently related to a particular computer or other apparatus. Various general-purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, various features are grouped together in a single embodiment to streamline the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A system to test a system under test (SUT), comprising:
a processor; and
a non-volatile memory storing test platform program code, the test platform program code operable when executed upon by the processor to:
control a user interface of a workstation that is configured to receive input for a test to test the SUT, the input including a plurality of test attributes and a selected performance metric, wherein the plurality of test attributes include a number of simulated users for the test, a geographic location of the test, a test duration, a test ramp up time, and a test ramp down time;
generate the test for the SUT based on the plurality of test attributes;
deploy an agent to a pool of servers to execute the test on a server of the pool of servers, the server selected from the pool of servers based on the plurality of test attributes, the agent for generating first network traffic in accordance with the plurality of test attributes to test the SUT;
store second network traffic, the second network traffic comprising test results received from applying the first network traffic to the SUT;
process the test results to determine a resulting performance metric for the SUT; and
display the resulting performance metric on the user interface.

2. The system of claim 1 wherein the pool of servers to which the agent is deployed is selected in response to a virtual user attribute of the at least one test attribute.

3. The system of claim 2, wherein the non-volatile memory stores a plurality of pre-generated tests, and wherein at least two of the plurality of pre-generated tests are associated with different geographic locations.

4. The system of claim 3 wherein the plurality of test attributes further include one or more of a test name attribute, a line of business attribute, and a duration attribute.

5. The system of claim 1 wherein the plurality of test attributes further include a web address for storing the test results.

6. The system of claim 1 wherein the selected performance metric includes one or more of an average response time, an average transaction rate or an error rate for the test.

7. The system of claim 6 wherein the selected performance metric includes failure criteria, and wherein the test platform program code is further operable when executed upon by the processor to terminate the test when the resulting performance metric satisfies the failure criteria.

8. The system of claim 7 wherein the selected performance metric is comprised of a plurality of performance metrics, each having respective failure criteria, and wherein the test platform program code is further operable to terminate the test when any of the plurality of performance metrics satisfies their respective failure criteria.

9. A method for testing a (SUT) including the steps of:
receiving a plurality of test attributes and a selected performance metric at a user interface of a workstation, wherein the plurality of test attributes include a number of simulated users for a test, a geographic location of the test, a test duration, a test ramp up time, and a test ramp down time;

generating the test for the SUT based on the plurality of test attributes;

deploying an agent to a pool of servers to execute the test on a server of the pool of servers, the server selected from the pool of servers based on the plurality of test attributes, the agent for generating first network traffic to test the SUT by executing the test based on the plurality of test attributes;

storing, in a non-volatile storage device, second network traffic comprising test results received from applying the first network traffic to the SUT;

processing the test results to determine a resulting performance metric for the SUT; and displaying the resulting performance metric on the user interface.

10. The method of claim 9 including the step of:

selecting the pool of servers to which the agent is deployed in response to a virtual user attribute of the at least one test attribute.

11. The method of claim 10, wherein the storage device storing a plurality of pre-generated tests, at least two of the plurality of pre-generated tests are associated with different geographic locations, and the method includes the step of displaying results of the at least two of the plurality of pre-generated tests.

12. The method of claim 11 wherein the plurality of test attributes further include one or more of a test name attribute, a line of business attribute, and a duration attribute.

13. The method of claim 9 wherein the plurality of test attributes further include a web address for storing the test results.

14. The method of claim 9 wherein the selected performance metric includes one or more of an average response time, an average transaction rate or an error rate for the test.

15. The method of claim 14 wherein the selected performance metric includes failure criteria, and wherein the method further includes the step of terminating the test when the resulting performance metric satisfies the failure criteria.

16. A test platform to manage for-managing a System Under Test (SUT) comprising:

a processor;

a graphical user interface (GUI); and a non-volatile memory having program code stored thereon, the program code operable when executed upon by the processor to manage the GUI to configure, launch and analyze a test of the SUT, the GUI comprising:

a test creation window configured to accept and display a plurality of test attributes and a first performance metric for the test from a user, the test attributes including a number of simulated users for the test, a geographic location of the test, a test duration, a test ramp up time and a test ramp down time;

a test launch window configured to accept and display one or more second performance metrics for the test, the second one or more performance metrics selected from a group including an error rate, a response time, or a transaction rate, wherein the memory includes program code configured to deploy an agent to a server to execute the test on the server, the server is selected from a pool of servers based on the test attributes, and the agent generates first network traffic to test the SUT; and a test result window configured to display one or more third performance metrics for the SUT, wherein the memory includes program code for processing second network traffic comprising test results received from applying the first network traffic to the SUT to determine the one or more third performance metrics for the SUT.

* * * * *

UNITED STATES PATENT AND TRADEMARK OFFICE
CERTIFICATE OF CORRECTION

| | | |
|---|---|---|
| PATENT NO. | : 10,795,805 B2 | Page 1 of 1 |
| APPLICATION NO. | : 16/429392 | |
| DATED | : October 6, 2020 | |
| INVENTOR(S) | : Sashi Kandru et al. | |

It is certified that error appears in the above-identified patent and that said Letters Patent is hereby corrected as shown below:

In the Claims

Column 10, Claim 9, Line 64; Please replace "A method for testing a (SUT) including the steps of:" with --A method for testing a System Under Test (SUT) including the steps of:--

Column 12, Claim 16, Line 5; Please replace "A test platform to manage for-managing a System" with --A test platform to manage a System--

Signed and Sealed this
Eighth Day of December, 2020

Andrei Iancu
*Director of the United States Patent and Trademark Office*